US006233291B1

(12) United States Patent
Shukhman et al.

(10) Patent No.: US 6,233,291 B1
(45) Date of Patent: May 15, 2001

(54) METHOD AND APPARATUS FOR PERFORMING DATA SORTING IN A DECODER

(75) Inventors: Tzvi Shukhman, Ramat Aviv; Avi Kliger, Givatayim; Amir Ilevitzky, Ramat Aviv, all of (IL)

(73) Assignee: Metalink Ltd., Tel Aviv (IL)

( * ) Notice: Subject to any disclaimer, the term of this patent is extended or adjusted under 35 U.S.C. 154(b) by 0 days.

(21) Appl. No.: 09/113,904

(22) Filed: Jul. 10, 1998

Related U.S. Application Data

(62) Division of application No. 08/518,119, filed on Aug. 22, 1995, now Pat. No. 5,963,598.

(30) Foreign Application Priority Data

May 1, 1995 (IL) ........................................ 113572

(51) Int. Cl.[7] ........................................ H03D 1/04
(52) U.S. Cl. ........................ 375/341; 375/233; 714/796
(58) Field of Search ................................. 375/233, 340, 375/346, 229, 265, 341; 714/795, 792, 786, 793, 796, 794

(56) References Cited

U.S. PATENT DOCUMENTS

| 5,546,430 | 8/1996 | Liao et al. | 375/341 |
| 5,790,606 | * | 8/1998 | Dent | 375/348 |

OTHER PUBLICATIONS

Sistanizadeh, K., "A Comparison of Passband and Baseband Transmission Schemes for HDSL." IEEE Journal on Selected Area in Communications, vol. 9, No. 6, (Aug. 1991) pp. 885–894.

Joshi, V., et al., "Sequence Estimation Techniques for Digital Subscriber Loop Transmission with Crosstalk Interference." IEEE Transactions on Communications, vol. 38, No. 9, (Sep. 1990) pp. 1367–1374.

Seshadri, N., et al. "Decoding of Severly Filtered Modulation Codes Using the (M,L) Algorithm." IEEE Journal on Selected Area in Communications, vol. 7, No. 6, (Aug. 1989) pp. 1007–1016.

Lee, W. U., et al. "A Maximum–Likelihood Sequence Estimator with Decision Feed–Back Equalization." IEEE Transactions on Communications, vol. COM–25, No. 9, (Sep. 1977) pp. 971–979.

* cited by examiner

Primary Examiner—Chi H. Pham
Assistant Examiner—Emmanuel Bayard
(74) Attorney, Agent, or Firm—Ladas & Parry

(57) ABSTRACT

A vector decoder for detecting symbols transmitted along a communication channel is disclosed, as is a method for decoding symbols. The decoder includes at least two pairs of decision feedback equalizers and noise predictors operating on a plurality M of vectors of symbols being detected, a path storage unit, a metric determiner a sorter and a path builder. The vectors are ordered in accordance with quality levels and each noise predictor estimates the noise associated with its associated vector. The path storage unit stores M of the ordered vectors, each vector being of length L. The metric determiner is connected to the output of all of the decision feedback equalizers and the noise predictors and produces a performance metric for each of Q branches extending from each vector. Each branch is associated with one of Q possible symbol values. The sorter is connected to the output of the metric determiner and sorts data, formed of a) the symbol values and b) the vectors which they extend, in accordance with their performance metrics. The sorter also orders, from the M*Q performance metrics, the data having the M best performance metrics. The path builder is connected to the output of the sorter and associates the ordered data with the appropriate ones of the previously stored ordered vectors.

4 Claims, 4 Drawing Sheets

METHOD AND APPARATUS FOR PERFORMING DATA SORTING IN A DECODER

This application is a divisional of copending application (s) application Ser. No. 08/518,119 filed on Aug. 22, 1995. Now U.S. Pat. No. 5,465,598, claims the benefit thereof and incorporates the same by reference.

FIELD OF THE INVENTION

The present invention relates to symbol decoders in data communication receivers and to symbol decoders for high bit rate digital subscriber loop (HDSL) receivers.

BACKGROUND OF THE INVENTION

The demand for fast and reliable transmission of digital information has encouraged the development of many different types of communication transceivers (a transmitter and receiver in one element) which efficiently employ the minimal bandwidth of telephone lines. One such communication technique is quadrature amplitude modulation (QAM) and another is pulse-amplitude modulation (PAM).

For both techniques, a sequence of equally likely data symbols is transmitted as pulses over the communication channel at a fixed symbol rate which is significantly above than the bandwidth of the communication channel. As a result, the pulses are delayed and also spread out in time which means that their amplitude diminishes over time. The signal which is received by the receiver is a superposition of the pulses over time. The "memory" of a channel, known as the intersymbol interference (ISI), is then the amount of time, in symbols, in which the transmitted pulse still affects the subsequent pulses.

Furthermore, the communication channel is noisy, typically from cross-talk due to the fact that many conversations are carried over the same telephone cable. The cross-talk is often referred to as "near end Xtalk (NEXT)". Furthermore, the communication transceiver both transmits and receives at the same time. The transmission causes an echo within the signal received by the receiver.

One technique for reducing the effect of the intersymbol interference is the decision-feedback equalizer (DFE). This equalizer assumes that the signal at any one time is the sum of the previous N stretched pulses, where N is the memory of the channel. If the equalizer somehow knows the symbol values for all the previous N-1 stretched pulses, it can remove the influence of the previous N-1 pulses and, from the result, can determine the Nth symbol value. However, if any one decision was incorrect, the later decisions may be incorrect.

For integrated subscriber digital network (ISDN) signals, which are transmitted at 160 Kbits/sec, the memory of the channel is typically 40 symbols. For high bit rate digital subscriber loop (HDSL) signals, which are transmitted at 784 Kbits/sec in the U.S. and at 1168 Kbits/sec in Europe, the memory of the channel is typically 160 symbols. For 2 Mbit/sec channels, the memory of the channel is over 200 symbols.

A maximum likelihood sequence estimator (MLSE), implemented by the Viterbi algorithm, has been suggested to overcome the noise and intersymbol interference problems of high transmission rates over communication channels. The MLSE is the optimal receiver for channels with ISI; however, the MLSE increases in complexity as a function of the channel memory and the size Q of the symbol alphabet. Therefore, the MLSE is not practical for implementation in a real-time, high data rate communication channels with large channel memories and a symbol alphabet larger than 2.

The following three articles discuss different methods for implementing reduced state sequence estimators (RSSE) which reduce the complexity of the Viterbi algorithm but still offer the performance quality of the MLSE.

Vilas Joshi and David D. Falconer, "Sequence Estimation Techniques for Digital Subscriber Loop Transmission with Crosstalk Interference", *IEEE Transactions on Communications*, Vol. 38, No. 9, September 1990, pp. 1367–1374;

Nambirajan Seshadri and John B. Anderson, "Decoding of Severely Filtered Modulation Codes Using the (M,L) Algorithm", *IEEE Journal on Selected Areas in Communication*, Vol. 7, No. 6, August 1989, pp. 1007–1016; and Won U. Lee and F. S. Hill, Jr., "A Maximum-Likelihood Sequence Estimator with Decision-Feedback Equalizers", *IEEE Transactions on Communications*, Vol. COM-25, No. 9, September 1977, pp. 971–979.

The above literature propose several RSSE estimators. One of them is the (M,L) algorithm which, at every symbol interval, saves M symbol sequences of L symbols which represent M hypotheses of the actual sequence of symbols transmitted by the remote transmitter. At each interval, the algorithm determines which sequence provides the best match to the received signal and outputs the oldest symbol from the best sequence.

At every symbol interval, the sequences are branched to include one of the Q possible symbol levels (i.e. Q*M new sequences are produced). The new sequences are compared and the M best ones are selected.

The methods described in the above articles are complex where the complexity is a function of the sizes of M and L and of the alphabet size as indicated by Q. For example, the signal can be binary modulated and thus, symbols can have two levels (1 and -1). 2B1Q modulation is also popular which has four levels (-3, -1, 1, 3) or more levels. One of the above articles presents results for L=40, M varying from 8 to 32, both binary and quaternary symbol levels and for an ISDN channel (for whom the channel memory is of length 40). Another article presents results for L=30, M=4 or 8, binary symbol level signals. All of these RSSE estimators are complex due to the number and size of the sequences to be calculated. Furthermore, the estimators described do not provide significantly better results to compensate for their increased complexity over standard ISI reducing units.

SUMMARY OF THE PRESENT INVENTION

It is an object of the present invention to provide an improved, high bit rate receiver for telephone conversations which operates on signals having intersymbol interference, NeXT cross-talk and any uncancelled echo information.

Applicants have realized that an (M,L) reduced state sequence estimator can provide reasonable results without being as complex as in the prior art. For 2B1Q modulation and HDSL channels, Applicants show herein such a reduced state sequence estimator wherein M is 3 and L is 40 or 24. Unlike other (M,L) estimators discussed in the prior art, the estimator of the present invention is implementable in real-time.

The present invention is a symbol decoder which comprises a decision feedback equalizer (DFE) and a noise predictor for each of the M sequences. At each symbol interval, each DFE determines the intersymbol interference (ISI) for its corresponding sequence and each noise predictor estimates the noise for its associated sequence. The output of the corresponding DFE and noise predictor is removed from the incoming signal for the present the symbol interval. The resultant signal represents the newest symbol transmitted by the remote transmitter.

The present invention then determines the error between each possible symbol and the resultant signal. For each of the Q branched sequences, the present invention determines the accumulated error for that sequence.

The metrics are provided to a sorter which selects the M best metrics and provides a) the symbol values and b) the sequences from which they branch which are associated with the M best metrics to a path builder. The path builder associates the output of the sorter (which contains the M best branches) with the appropriate ones of the previously stored sequences.

The sorter also produces the oldest symbol from the sequence which produced the best metric. This symbol is the output of the decoder of the present invention.

Moreover, in accordance with a preferred embodiment of the present invention, the path storage unit includes M groups of columns and L rows. The M groups of columns are ordered in accordance with the quality levels and, for each row n, each group of columns stores a) the symbol, added at time n, which is associated with the quality level of the group of columns and b) the vector from which the symbol branched. For example, M can be three, L ranges from 20–60 and there are four branches.

Furthermore, in accordance with a preferred embodiment of the present invention, the sorter includes a plurality M of sorting units and a processing unit, wherein each sorting unit M is associated with one of the quality levels. Each sorting unit includes a magnitude determiner and a level orderer. The magnitude determiner determines if the received performance metric is larger than a performance metric previously stored therein, sets a binary flag F accordingly, and provides the binary flag F to the processing unit for processing. The level orderer changes the level associated with the sorting unit only if the binary flag indicates that the received performance metric is smaller than the stored performance metric. The level orderer includes an increaser, for increasing the level associated with the sorting unit if the level is not the highest level and a decreaser for decreasing the level associated with the sorting unit if the level is the highest level, the decreasing means setting the level to the output of the processing unit.

The present invention also incorporates the methods implemented by the vector decoder and by the sorter.

BRIEF DESCRIPTION OF THE DRAWINGS AND APPENDIX

The present invention will be understood and appreciated more fully from the following detailed description taken in conjunction with the drawings in which.

DETAILED DESCRIPTION OF A PREFERRED EMBODIMENT

Figure 1:
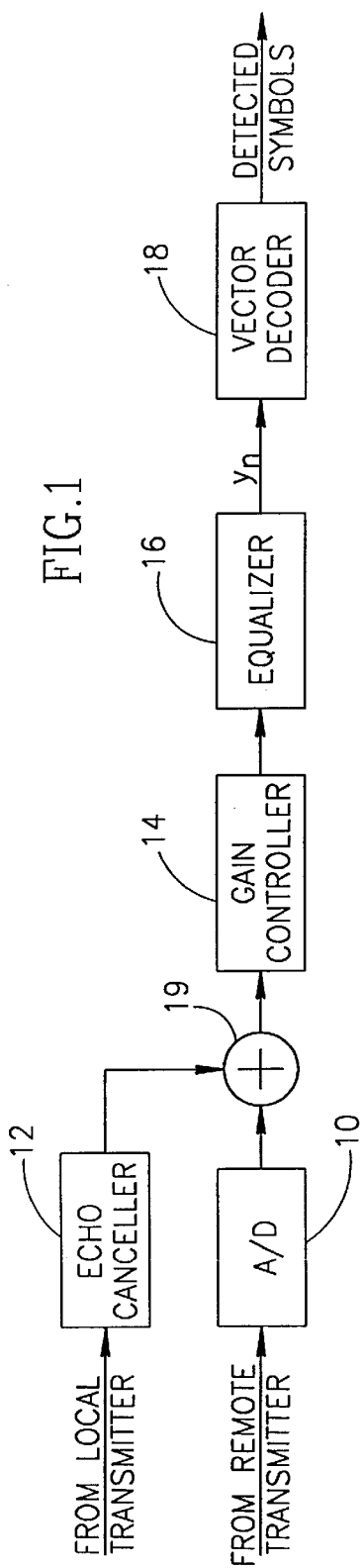
FIG. 1 is a block diagram illustration of a data communication channel receiver.

Reference is now briefly made to FIG. 1 which illustrates a standard, full duplex, data communications receiver. The receiver comprises an analog-to-digital converter 10, an echo canceller 12, a gain controller 14, a linear equalizer 16 and a vector decoder 18. The A/D converter 10 receives an analog, modulated signal from a remote transmitter (the signal to be decoded) and converts it to a digital modulated signal. The analog signal comprises the symbols to be decoded as well as echoes and noises. The analog signal can be sent along any type of communication channel; for example, it can be sent along copper loops or via satellite. The communication can be with binary modulation (symbol values of 1 and −1), 2B1Q modulation (e.g. symbol values of −3, −1, 1, 3) or any other Q-ary modulation method.

The local transmitter, not shown, transmits a signal at the same time that the receiver receives a signal. Since the two signals (incoming and outgoing) travel along the same physical line, the incoming signal may include echoes of the outgoing signal. Therefore, the echo canceller 12 receives the symbols transmitted by the local transmitter, and from them, reproduces the echo portion of the input signal. A subtractor 20 removes the output of the echo canceller 12 from the digital modulated signal, thereby producing an "echo-free" signal. The gain controller 14 detects the signal level of the remote transmitter and adjusts the signal level to an optimal level for processing by the remaining elements of the receiver. The linear equalizer 16 is an adaptive finite impulse response (FIR) filter which removes the pre-cursor intersymbol interference in the echo-free and gain adjusted digital signal and produces a signal $y_n$. The vector decoder 18 produces a vector of detected symbols and is the subject of the present invention. The remaining elements are known in the art and therefore, are not described in detail hereinbelow.

Reference is now made to FIGS. 2–6 which illustrate the vector decoder 18 of the present invention. The vector decoder 18 is a reduced state sequence estimator which determines a plurality M of possible sequences and determines the value of a symbol received L symbol intervals previously from the sequence (of the M sequences) which has the best performance metric L symbol intervals later.

Figure 2:
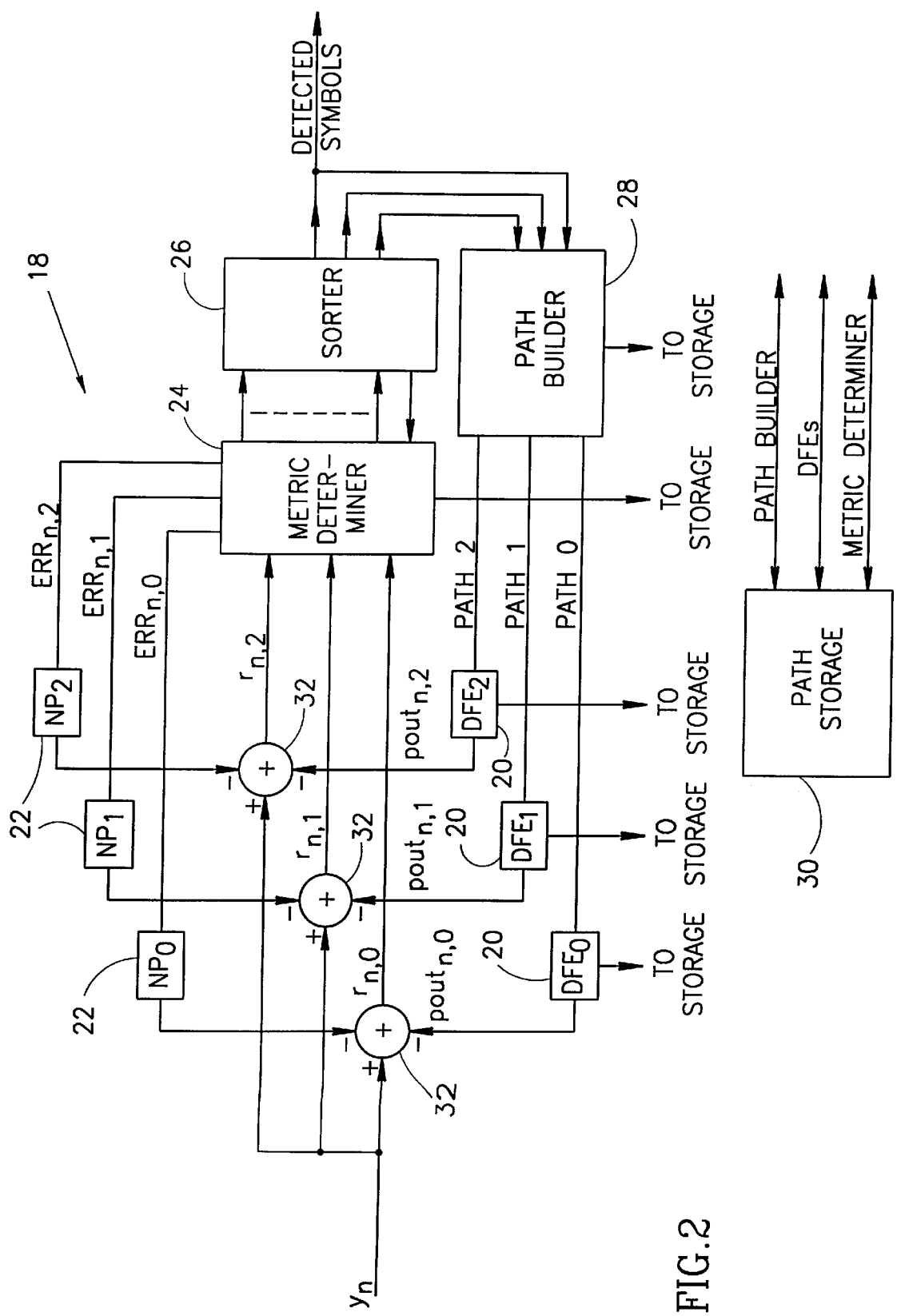
FIG. 2 is a block diagram illustration of a symbol decoder, constructed and operative in accordance with a preferred embodiment of the present invention.

As shown in FIG. 2, the vector decoder 18 comprises a plurality M of decision feedback equalizers (DFEs) 20, a plurality M of noise predictors (NPs) 22, a metric determiner 24, a path sorter 26, a path builder 28 and a path storage unit 30. The DFEs 20 and noise predictors 22 are formed into pairs where each pair operates on one of the M possible paths. The path storage unit 30 is accessible by all elements and stores each of the M possible paths, where each path is of length L.

FIG. 2 illustrates that M is three. Applicants have realized that there is no need to store many possible paths to produce reasonable results. The present application illustrates that M is three and Q is 4. Furthermore, Applicants have realized that there is no need to utilize long paths; a path which is generally one-sixth the size of the channel memory will provide reasonable results. Thus, for HDSL channels (whose channel memory is of length 120–240 symbols), the present invention utilizes L of length from 24 to 40. This combination of values is operative for many types of communication channels, such as for carrier service areas (CSA) communication channels at HDSL transmission rates and 2B1Q symbol modulation. Other values for M, L and Q are possible and are incorporated into the present invention, it being recognized that the vector decoder 18 increases in complexity with every increase in M and L.

Furthermore, in accordance with a preferred embodiment of the present invention, the present invention incorporates noise predictors for each of the M possible paths in order to improve the likelihood that the symbol selected is the correct one.

For each path k, the associated DFE 20 produces an estimate of the ISI utilizing the L symbols of the path up to, but not including the symbol $A_n$ which is new at the symbol interval n. The noise predictor 22 associated with the path k produces an estimate of the noise due to the previous L symbols. A subtractor 32 associated with the path k removes the output of the associated DFE 20 and NP 22 from the signal $y_n$, thereby producing a single symbol signal $r_{n,k}$ for the associated path k. $R_{n,k}$ is the symbol value if the ISI estimate and the noise estimate, for the kth path, is correct.

The symbol which was received at symbol interval n, and which should be represented in $r_{n,k}$, can be any of the Q possible symbol values. The metric determiner 24 produces Q possible branches of each path k, one for each of the Q symbol values, and determines a performance metric for each branch. The performance metric $m_{k,j}$ is a function of the single symbol signal $r_{n,k}$ for the path k and for the symbol j of the branch and is a function of the difference in magnitude between the single symbol signal $r_{n,k}$ and the symbol j.

The sorter 26 sorts the performance metrics $m_{k,j}$ to select the M lowest valued ones and associates the performance metrics with the path numbers k in accordance with their values. Thus, the lowest valued performance metric $m_{k,j}$ is associated with the lowest valued path number k (e.g. path number k=0), etc. The sorter 26 then provides the path numbers k, their associated new symbols j and the numbers of the old paths from which they branch, to the path builder 28. The sorter 26 also provides the error calculations, for each of the three new paths k, to the associated noise predictors 22 which, in turn, predict the noise for each of the new paths. Finally, the sorter 26 selects, as the detected symbol, the last symbol j of the new path which had the smallest performance metric $m_{k,j}$.

The path builder 28 updates the paths k stored in the path storage unit 30. The DFEs 20 then operate on the new paths and the noise predictors 22 operate on the new error values.

Figure 3:
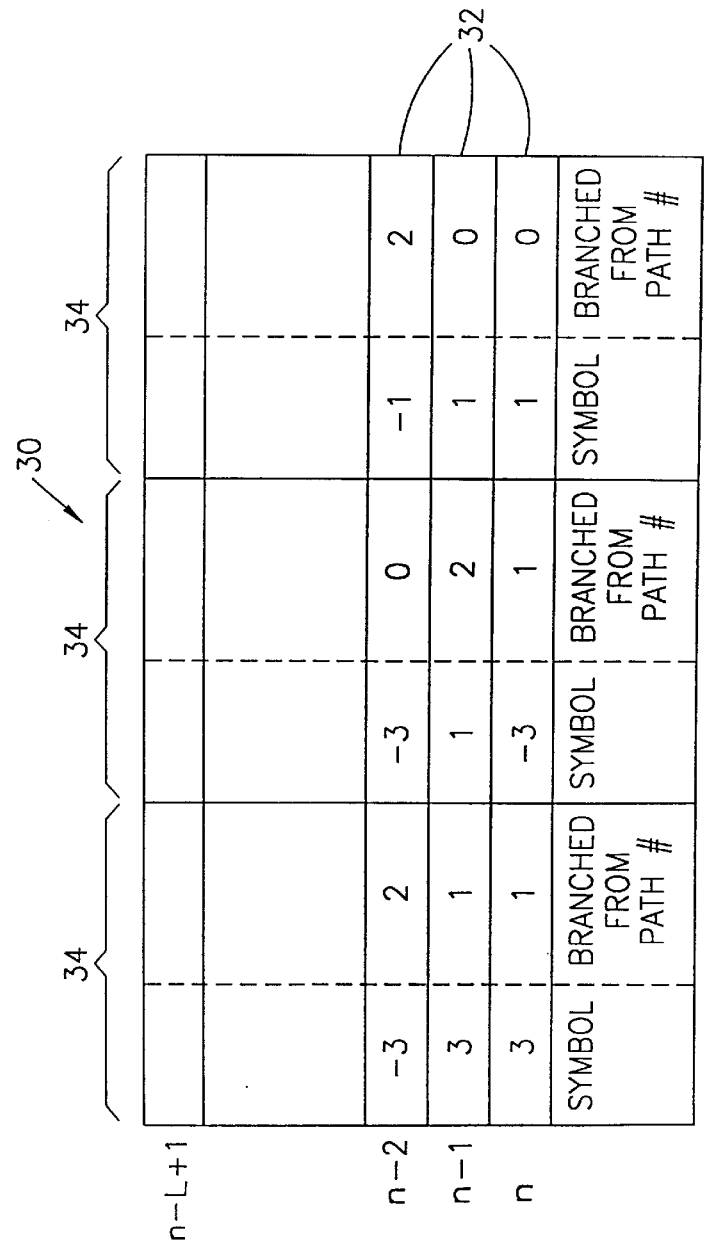
FIG. 3 is a schematic illustration of a path storage element forming part of the decoder of FIG. 2.

The path storage unit 30 is detailed in FIG. 3. It is formed of a circular random access memory (RAM) having L rows, labeled 32, and M groups, labeled 34, of columns. The groups 34 are ordered according to the quality of the relevant performance metric for the (n−i)th symbol interval and each row 32 comprises the necessary path information for the (n−i)th symbol interval, where i=0 to L. The first group, labeled 0, stores the symbols of the paths having the smallest performance metric and the last group, labeled, for example, 2, stores the symbols of the paths having the third smallest performance metric. Each group 34 also stores a previous path number indicating the path number at the time (n−i)−1 from which the path at time n−i branched.

For example, assume that the symbol modulation is 2B1Q having possible symbol values (−1, 1, 1, 3), and that M=3. The values in the nth, (n−1)th and (n−2)th rows are as shown in FIG. 3. At time n, the path with the best performance metric was the one which branched from the previous path k=1 with the symbol value 3. The symbol at time n−1 for the best path is the one stored with path k=1 at time n−1. Thus, the previous symbol along the best path is 1, as stored in row n−1, column k=1. In row n−1, k=1, the previous path number is 2, indicating that the best path branched from the one that was previously third best. In row n−2, column k=2, the symbol −1 is stored and a notation that the path was previously third best (k=2). Thus, from n−2 to n, the best path has the symbols (−1, 1, 3).

It will be appreciated that the path storage unit 30 stores the multiple path information generally efficiently. At each symbol interval, the newly added symbol and the path from which it branched are stored. The symbols of any path can easily be determined, just by traversing backwards through path storage unit 30. Furthermore, since the path storage unit 30 is formed from circular RAM, the data at the current time is always written over the oldest data. Finally, the value of the detected symbol for time n, is easily determined. It is the symbol value produced when traversing the path storage unit 30 from the first column (k=0) at symbol interval n back to row n−L+1. It is not, necessarily, the symbol value stored in the first column at time n−L+1.

Each DFE 20 traverses path storage unit 30 backwards to determine the path symbols for its associate path. It then performs a filtering operation, as follows, to produce its output signal, labeled $pout_{n,k}$.

$$pout_{n,k} = \sum_{i=0}^{L-1} D_{n,i} A_{n-i,k} \qquad (1)$$

where the variables $D_{n,i}$ are defined by:

$$D_{n,i} = D_{n-1,i} + \mu_d A_{n-,0} err_n \qquad (2)$$

$\mu_d$ is the DFE step size and $err_n$ is the smallest error value (of the Q*M errors produced by the metric determiner 24) for the nth symbol interval, as defined hereinbelow.

The noise predictors 22 predict the noise from the error signals $err_{n,k}$ produced by the metric determiner 24, where each one operates on the error signal appropriate for its path k. The operation of each noise predictor 22 is as follows:

$$npout_{n,k} = P_n err_{n-1,k} \qquad (3)$$

where the variables $P_{n,i}$ are defined by:

$$P_{n,i} = P_{n-1} + \mu_d err_n err_{n-1} \qquad (4)$$

and where $\mu_p$ is the noise predictor step size.

Subtractors 32 then subtract the outputs of their associated DFEs 20 and noise predictors 22 from the incoming signal $y_n$, as follows:

$$r_{n,k} = y_n - npout_{n,k} - pout_{n,k} \qquad (5)$$

As mentioned hereinabove, the metric determiner 24 receives the difference signals $r_{n,k}$ and determines the performance metrics $m_{k,j}$ for each branch j of each path k. The performance metrics are calculated as follows:

$$m_{k,j} = m_k + (r_{n,k} - S_j)^2 \qquad (6)$$

where $m_k$ is the accumulated value of the path k, as defined hereinbelow.

Once the sorter 26 determines which are the k best branches of the M*Q possibilities, it provides this information to the metric determiner 24 which, in turn, updates the signals mk and errk as follows:

$$m_k = m_{k,j} \text{ for the chosen branch } j \qquad (7)$$

$$m_k = m_k - m_0 \qquad (8)$$

where $m_0$ is the best metric.

Equation 8 normalizes the metrics to indicate only their difference from the best one.

$$err_{n,k} = err_{k,j} \text{ for the chosen branch } j \qquad (9)$$

$$err_n = err_{n,0} = err \text{ of the best branch} \qquad (10)$$

The signals $err_{n,k}$ are provided to their respective noise predictors 22 and the signal $err_n$ is provided to the DFEs 20 and to the noise predictors 22. It will be appreciated that the parameters, defined by $err_n$, of the DFE 20 and noise predictor 22 of each path are the same.

Figure 4:
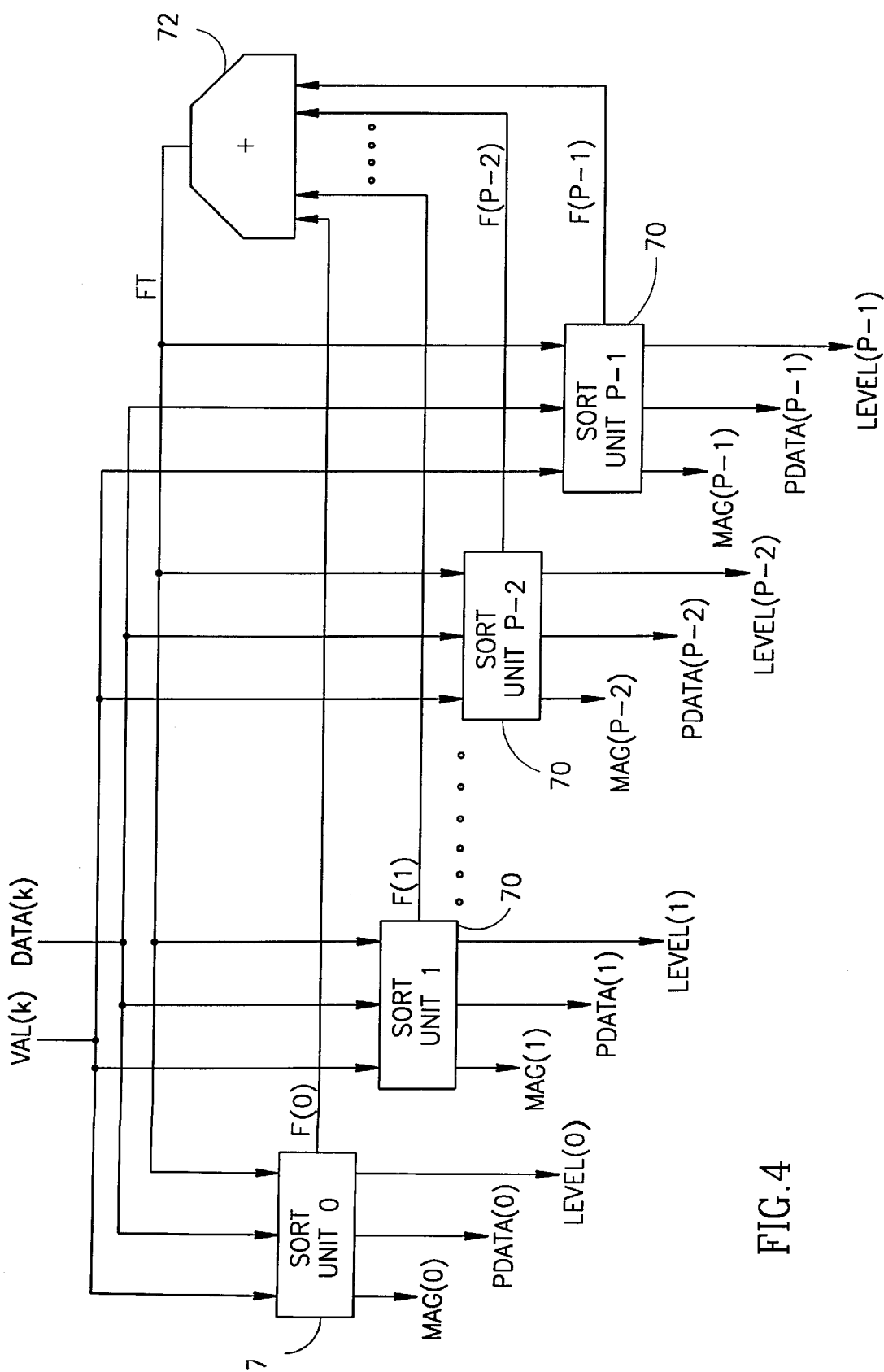
FIG. 4 is a block diagram illustration of a sorter forming part of the decoder of FIG. 2.

The sorter 26 is illustrated in FIG. 4 and its operation is illustrated in FIGS. 5A–5C and 6. The sorter 26 comprises a plurality P of sorting units 70, labeled 0 to P-1, and a summer 72. The sorting units 70 are arranged such that the one with the lowest number or level always stores the smallest performance metric, etc.

Each sorting unit 70 receives the performance metric $m_{k,j}$, labeled VAL(k), and any associated data (DATA(k)), such as the symbol j and path k associated with the performance metric. Each ith sorting unit 70 then determines if the new performance metric VAL(k) is larger or smaller than the performance metric, labeled $MAG_i$, previously associated therewith. The sorting units 70 then reorder themselves (i.e. change their levels) to ensure that the smallest performance metric is stored within the sorting unit 70 with the lowest level.

Figure 5A:
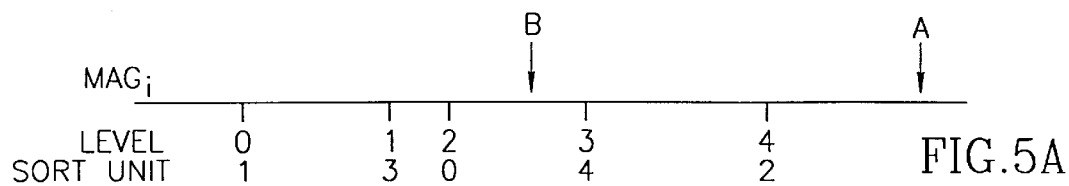
FIGS. 5A, 5B and 5C are schematic illustrations useful in understanding the operation of the sorter of FIG. 4.
Figure 5B:
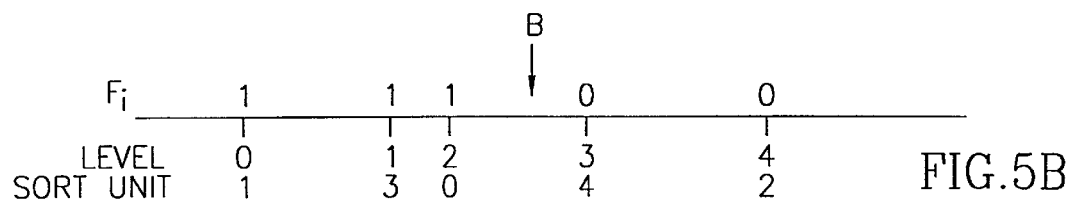
Figure 5C:
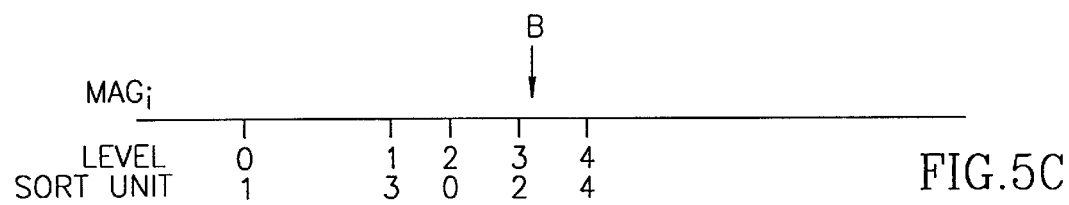

The operation of the sorter 26 is illustrated in FIGS. 5A–5C. In FIG. 5A, five MAG values, with their associated levels and the sorting units 70 in which they are stored, are shown on a line. If VAL(k) has the value A, all of the sorting units 70 will indicate that it is larger than the values $MAG_i$ stored within them and none of the sorting units 70 will change their order.

If VAL(k) has the value B, whose value is between that of levels 2 and 3, the levels will have to be reordered. The comparison of the values $MAG_i$ with the input value VAL(k) affects flags $F_i$ where $F_i$ becomes 1 only if VAL(k) is larger than the $MAG_i$ stored in the ith sorting unit 70. FIG. 5B shows the values of $F_i$ for each of the levels 0–4. As can be seen, $F_i$ is set to 1 for the levels whose $MAG_i$ is smaller than the value B and is 0 for all the other levels.

For those sorting units 70 whose $F_i$ was 1 (e.g. sorting units 1, 3 and 0), their levels do not change. However, for those whose $F_i$ was 0 (e.g. sorting units 4 and 2), their levels are increased by one. Thus, the old level three, of sorting unit 4, becomes the new level four.

The summer 72 sums the values of $F_i$ to produce FT which, in the illustrated case, is 3. The level associated with B is set to FT=3. The sorting unit 70 which previously had the largest level (i.e. sorting unit 2) stores the value of B and receives the new level FT=3. This sorting unit 70 also stores the data associated with the value B.

Figure 6:
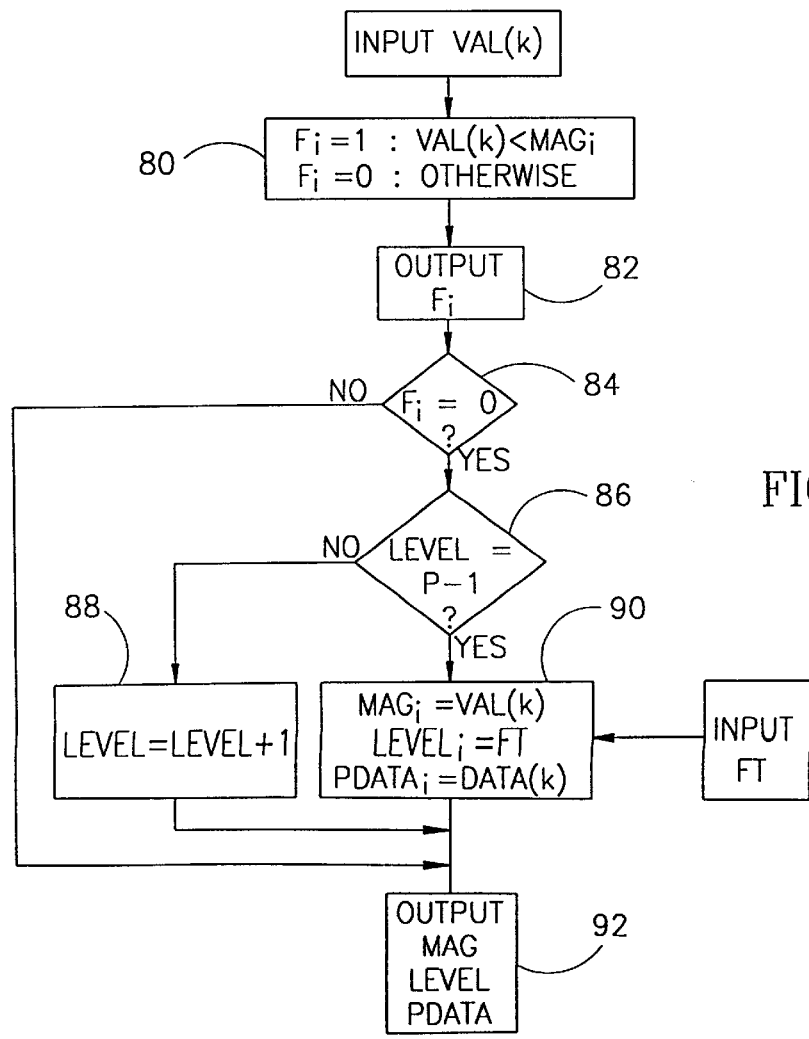
FIG. 6 is a flow chart illustration of the operations of a single sort mechanism forming part of the sorter of FIG. 4; and Appendix A which is a net list of an exemplary implementation of the decoder of the present invention, is incorporated by reference from U.S. Patent 5,963,598 issued October 5, 1999.

FIG. 6 is a flow chart of the operations of the ith sorting unit 70; it being understood that each sorting unit 70 performs the same operations. In step 80, the flag $F_i$ is set by comparing the internal value $MAG_i$ with the input VAL(k). In step 82, the value of the flag $F_i$ is provided to the summer 72. In step 84, the value of $F_i$ is checked. If it is 0, the sorting unit 70 makes no changes to its internal data or to its level and continues at the output step 92. If $F_i$ is 1, the previous level is checked (step 86). If the level is not the highest possible (P-1), then the sorting unit 70 only needs to increase its level (step 88). If the level is the highest possible, then the sorting unit 70 receives the input value of VAL(k) and the data, DATA(k), associated therewith (step 90). These are stored in $MAG_i$ and $PDATA_i$. Additionally, the level is set to FT as determined by the summer 72 (step 90).

It will be appreciated that the sorter 26 determines whether or not to save a performance metric $m_{k,j}$ at each clock cycle, which is typically much higher than the symbol interval rate. Therefore, in M*Q clock cycles, the sorter 26 can sort the M*Q performance metrics.

The sorter 26 sorts the M*Q performance metric values $m_{k,j}$ and saves only the P best ones, where typically P=M. Once all the performance metrics $m_{k,j}$ have been provided to the sorter 26, it outputs the information stored in each of the P sorting units 70. This information is provided to the path builder 28 which, in turn, stores the symbol and previous path information in the path storage unit 30. Specifically, the path builder 28 stores the information from the sorting unit 70 with the lowest level in the first column of path storage unit 30, stores the information from the sorting unit 70 with the next lowest level in the second column of path storage unit 30, etc.

It will be appreciated by persons skilled in the art that the DFEs 20 and noise predictors 22 do not have to be separately implemented, as shown in FIG. 2. They can, alternatively, be implemented as a single DFE 20 and a single noise predictor 22 which operate on each path separately.

The symbol decoder of the present invention has been implemented, for example, on an integrated circuit operative to decode symbols from twisted pair copper loops at HDSL symbol rates and for 2B1Q modulation. Furthermore, the chip is produced using 0.6 μm technologies and the internal clock rate is 45 MHz for data rates of 1.168 Mbps and 62 MHz for data rates of 1.5 Mbps. It will be appreciated that the implementation is provided for exemplary purposes only and is not intended to be limiting.

It will be appreciated by persons skilled in the art that the present invention is not limited to what has been particularly shown and described hereinabove. Rather the scope of the present invention is defined by the following claims:

What is claimed is:

1. A sorter comprising:

a plurality M of sorting units; and a processing unit, wherein each sorting unit is associated with one of a multiplicity of quality levels and comprises:

means for determining if a received value is larger than a value previously stored therein, for setting a binary flag F accordingly, and for providing said binary flag F to said processing unit for processing; and level order means for changing the level associated with said sorting unit only if said binary flag indicates that said received value is smaller than said stored value, wherein said level order means comprises:

increasing means for increasing the level associated with said sorting unit if said level is not the highest level; and decreasing means for decreasing said level associated with said sorting unit if said level is the highest level, said decreasing means setting said level to the output of said processing unit.

2. A vector decoder for detecting symbols transmitted along a communication channel, the decoder comprising:
- at least two pairs of decision feedback equalizers and noise predictors operating on a plurality M of vectors of symbols being detected, wherein the vectors are ordered in accordance with quality levels and therein each noise predictor estimates the noise associated with its associated vector;
- a path storage unit for storing M of said ordered vectors, each said stored ordered vector being of length L;
- a metric determiner connected to the output of all of said decision feedback equalizers and said noise predictors, wherein said metric determiner produces a performance metric for each of Q branches extending from each vector, where each branch is associated with one of Q possible symbol values;
- a sorter, connected to the output of said metric determiner, wherein said sorter sorts data, formed of a) the symbol values and b) the vectors which they extend, in accordance with their performance metrics and orders, from M*Q performance metrics, the data having the M best performance metrics, thereby producing ordered data;
- a path builder, connected to the output of said sorter, wherein said path builder associates said ordered data with appropriate ones of said stored ordered vectors,
- wherein said sorter comprises a plurality M of sorting units and a processing unit, wherein each sorting unit is associated with one of said quality levels and comprises:
  - means for determining if the received performance metric is larger than a performance metric previously stored therein, for setting a binary flag F accordingly, and for providing said binary flag F to said processing unit for processing; and
  - level order means for changing the level associated with said sorting unit only if said binary flag indicates that said received performance metric is smaller than said stored performance metric,
  - wherein said level order means comprises:
    - increasing means for increasing the level associated with said sorting unit if said level is not the highest level; and
    - decreasing means for decreasing said level associated with said sorting unit if said level is the highest level, said decreasing means setting said level to the output of said processing unit.

3. A method for detecting symbols transmitted along a communication channel, the method comprising the steps of:
- performing decision feedback equalization and noise prediction on M vectors, of length L, of symbols being detected and wherein the vectors are ordered in accordance with quality levels;
- producing a performance metric for each of Q branches extending from each vector, where each branch is associated with one of Q possible symbol values;
- sorting data, formed of a) the symbol values and b) the vectors which they extend, in accordance with their performance metrics, thereby producing ordered data;
- ordering, from M*Q performance metrics, the data having the M best performance metrics;
- associating said ordered data with the appropriate ones of said ordered vectors,
- wherein said step of sorting comprises the steps of:
  - determining if the received performance metric is larger than a previously stored performance metric and setting a binary flag F accordingly,
  - providing said binary flag F to a processing unit for processing;
  - changing the level associated with said sorting unit only if said binary flag indicates that said received performance metric is smaller than said stored performance metric, wherein said step of changing comprises the steps of:
    - increasing the level associated with said sorting unit if said level is not the highest level; and
    - decreasing said level associated with said sorting unit if said level is the highest level, said decreasing means setting said level to the output of said processing unit.

4. A method according to claim 3 and wherein M is three, L ranges from 20–60 and Q is four.

* * * * *